United States Patent [19]

O'Brien et al.

[11] Patent Number: 5,711,922
[45] Date of Patent: Jan. 27, 1998

[54] PREFERENTIAL HYDROMETALLURGICAL CONVERSION OF ZINC SULFIDE TO SULFATE FROM ZINC SULFIDE CONTAINING ORES AND CONCENTRATES

[76] Inventors: Robert N. O'Brien, 2614 Queenswood Drive, Victoria, British Columbia, Canada, V8N 1X5; Ernest Peters, 2708 W. 33rd Avenue, Vancouver, British Columbia, Canada, V6N 2G1

[21] Appl. No.: 622,024

[22] Filed: Mar. 26, 1996

Related U.S. Application Data

[63] Continuation of Ser. No. 290,206, Aug. 15, 1994, abandoned.

[51] Int. Cl.[6] ................................................. C22B 19/02
[52] U.S. Cl. ............................................. 423/106; 205/607
[58] Field of Search ............................. 423/106; 205/607

[56] References Cited

U.S. PATENT DOCUMENTS

| | | | |
|---|---|---|---|
| 1,435,699 | 11/1922 | Christensen | 423/106 |
| 1,937,631 | 12/1933 | Christensen | 205/607 |
| 2,435,340 | 2/1948 | Christensen . | |
| 2,609,272 | 9/1952 | Udy . | |
| 3,655,538 | 4/1972 | Renken et al. . | |
| 3,656,941 | 4/1972 | Matthew et al. . | |
| 3,888,748 | 6/1975 | Brennecke . | |
| 3,910,636 | 10/1975 | Hard . | |
| 3,912,330 | 10/1975 | Carnahan et al. . | |
| 3,933,478 | 1/1976 | Moore . | |
| 4,071,421 | 1/1978 | Masters et al. . | |
| 4,132,758 | 1/1979 | Frankiewicz et al. . | |
| 4,440,569 | 4/1984 | Weir et al. . | |
| 4,647,307 | 3/1987 | Raudsepp et al. . | |
| 4,710,277 | 12/1987 | Dyvik et al. . | |

FOREIGN PATENT DOCUMENTS

| | | |
|---|---|---|
| 864455 | 2/1971 | Canada . |
| 876034 | 7/1971 | Canada . |
| 2 070 315 | 12/1993 | Canada . |
| 0 113 649 | 7/1984 | European Pat. Off. . |
| 0 119 685 | 9/1984 | European Pat. Off. . |
| 0 166 710 | 1/1986 | European Pat. Off. . |
| 0227626 | 1/1987 | European Pat. Off. . |
| 0 272 060 | 6/1988 | European Pat. Off. . |
| 2190928 | 6/1973 | France . |
| 2114966 | 9/1983 | United Kingdom . |
| WO92/15713 | 9/1992 | WIPO . |
| PCT/CA94/00034 | 1/1994 | WIPO . |
| WO94/17216 | 8/1994 | WIPO . |

OTHER PUBLICATIONS

International Search Report of PCT/CA 95/00473 dated Sep. 12, 1995 by W. Fischer.

(List continued on next page.)

*Primary Examiner*—John Niebling
*Assistant Examiner*—Brendan Mee

[57] ABSTRACT

A hydrometallurgical process for converting zinc sulfide in an ore containing zinc sulfide, said zinc sulfide being chemically converted at elevated temperatures to $ZnSO_4.xH_2O$ which crystallizes substantially in the monohydrate form as $ZnSO_4.H_2O$ in a conversion solution having a high concentration of $H_2S_4$. The process comprises:

i) contacting the zinc sulfide of the ore with the conversion solution which comprises a concentration of sulfuric acid selected from the range of about 45% by weight up to about 70% by weight of the conversion solution and at the elevated temperature in the range of 90° C. to less than boiling point of the conversion solution for the selected concentration of sulfuric acid;

ii) maintaining the conversion solution at the elevated temperature and at the range of concentration of the sulfuric acid to ensure continued formation of the crystals of $ZnSO_4.H_2O$ until substantially all available ZnS is chemically converted; and iii) separating the $ZnSO_4.H_2O$ crystals and remaining solids of the ore from the conversion solution.

8 Claims, 1 Drawing Sheet

OTHER PUBLICATIONS

K. Tkacova et al., *Structural and Temperature Sensitivity of Leaching of Chalcopyrite with Iron (III) Sulphate*, Hydrometallurgy, vol. 21, pp. 103–112 (1988) no month avail.

J. Avraamides et al., *Cuprous Hydrometallurgy Part VI. Activation of Chalcopyrite by Reduction with Copper and Solutions of Copper (I) Salts*, Hydrometallurgy, vol. 5, pp. 325–336 (199), no month avail.

G. Van Weert et al. dissertation entitled, *Chloride and Nitrate Systems in Hydrometallurgy Applications and Opportunities*, Dec. 1989.

W. Barzyk et al., Electrochemical Studies of Stoichiometry Changes of Copper Sulfide ($Cu_{2-x}S$) Grains in Acid Cupric Sulfate Solutions, (Inst. Catal. Surfac. Chem., Pol. Acad. Sci., 30–239 Krakow, Pol.), Mater. Sci. Forum 1988, 25–26 (Chem. Interfaces), 565–8 (Eng.) (abstract), no month avail.

R.I. Agladze et al., Processing Sulfide Ores Containing Nonferrous Metals, Otkrytiya, Izobret., Prom. Obraztsy, Tovarnye Znaki 1981 (21), 140, no month avail., (abstract).

R.W. Adams et al., Direct Leaching of Zinc Concentrates at Atmospheric Pressure, Lead–Zinc '90, ed. Mackey & Prengaman, TMS, 420 Commonwealth Drive, Warrendale, PA 15086 (1990), no month avail.

D.S. Flett, The Role of Hydrometallurgy in Extractive Metallurgy, Chemistry and Industry, Jun. 20, 1981, pp. 427–431.

*The Condensed Chemical Dictionary*, Tenth Edition, (1981), pp. 278, 489, 873 and 1112, no month avail.

Rakesh Kumar et al., Zinc Recovery From Zawar Ancient Siliceous Slag, Hydrometallurgy, vol. 15, (1986), pp. 267–280, no month avail.

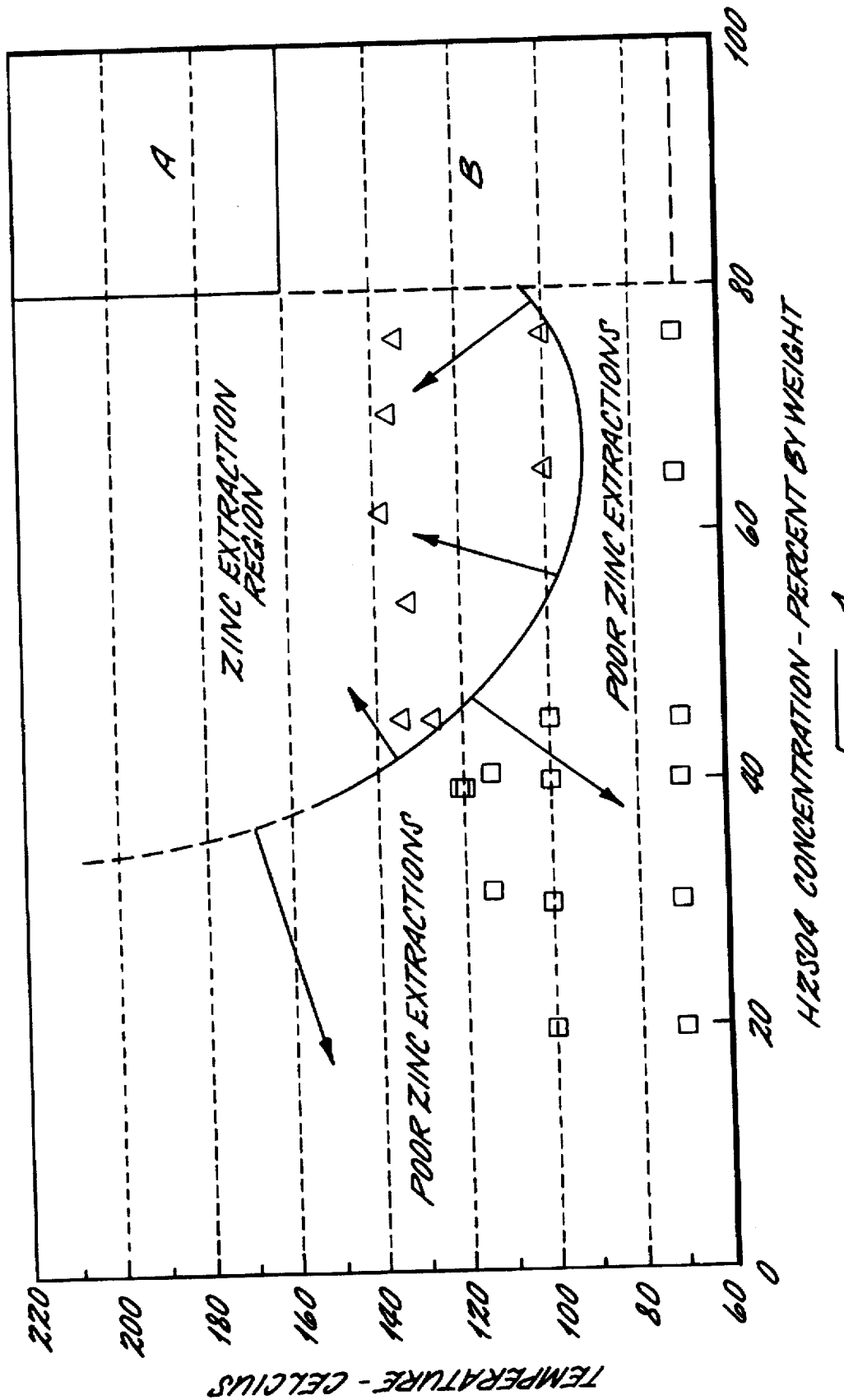

PREFERENTIAL HYDROMETALLURGICAL CONVERSION OF ZINC SULFIDE TO SULFATE FROM ZINC SULFIDE CONTAINING ORES AND CONCENTRATES

This application is a continuation, of application Ser. No. 08/290,206, filed Aug. 15, 1994 now abandoned.

FIELD OF THE INVENTION

The present invention relates to a hydrometallurgical process for conversion of zinc sulfide in an ore at high temperatures using high concentrations of sulfuric acid.

BACKGROUND OF INVENTION

There is a significant push to develop commercial forms of a hydrometallurgical process to recover various types of metal from sulfidic ore bodies. The significant advantage of a hydrometallurgical process over the standard smelting process, is the significant reduction in sulfur dioxide emissions. Although the chemistry might appear to be relatively direct in extracting zinc from sulfide ores, all known commercial approaches in this regard either treat only zinc concentrates containing less than 1% copper, or have either failed or are not economically viable. It is known that several of these hydrometallurgical processes for leaching zinc from either a concentrate or a rich ore involve the use of sulfuric acid and/or nitric acid and/or nitrate salts. As is appreciated, although sulfuric acid is very useful in removing zinc sulfides from ore as soluble sulfates of this metal, the resultant leach solution has to be electrowon to recover the zinc because there is at present no other economically feasible way to separate the zinc sulfates from the dilute $H_2SO_4$ solution.

U.S. Pat. No. 4,710,277 describes a process for leaching zinc from zinc containing ores where the zinc is removed from the ore by one or more leaching stages. The leached material is then purified and preferably subjected to electrowinning to recover zinc from the leaching solution. Subsequent to one or more electrowinning steps, the remaining solution may be evaporated to increase the acid strength until it reaches a concentration of about 60% to 80% $H_2SO_4$. The solubility of zinc and magnesium in this composition decreases radically at acid strengths of this magnitude. As a result, there is precipitated a crystal mass which comprises mainly zinc sulfate; magnesium sulfate manganese sulfate. The remaining liquid is predominantly acid which can then be recycled in the process. The resultant crystal mass can either be discarded or dissolved in a small quantity of water. This redissolved solution of primarily magnesium sulfate, zinc sulfate and manganese sulfate can be discarded or recycled for further treatment. Alternatively, the zinc can be precipitated from the solution by neutralizing it at a high pH to facilitate dumping of the material. The process of evaporating and thereby concentrating the solution to form the crystalline mass is, however, expensive because of the significant fuel or energy costs for the evaporation step, and the need for corrosion resistant material used in the heat transfer evaporating process. Hence the process is not of commercial significance, because of the significant costs associated with recirculating the liquid phase and discarding the trace amount of metals in the liquids removed from the electrowinning stages.

In Canadian Patent No. 864,455 a process is disclosed to treat ores. 80% to 100% sulfuric acid by weight of the reaction solution at temperatures between 160° C. and 250° C. are used, causing a suspension of solids that includes anhydrous sulfates of copper and zinc. The solids are washed with water so that zinc sulfate and copper sulfate dissolve into solution. The zinc and copper are then recovered by electrowinning techniques. Such extremely high concentrations of sulfuric acid and extremely high temperatures result in a degradation of the zinc and copper sulfides into anhydrous sulfates with the concurrent production of $SO_2$ and a plastic form of sulfur which tends to be very gummy and hence hard to handle.

U.S. Pat. Nos. 4,071,421 and 4,440,569 to Sherritt Gordon disclose a pressure leach system which is very effective for separating zinc from ore or concentrate. However, the Commercial aspect of the process requires that the ore or concentrate contain less than 0.5% by weight copper and preferably less than 0.1% by weight copper; otherwise, significant processing complications arise along with consequent plant shutdown and equipment clean out.

Furthermore, none of the above processes work well with all types of zinc sulfide containing ores or concentrates. For example, other prominent supplies for zinc sulfide containing ore or concentrate include lead/zinc ores and zinc/silicate ores. Usually one or more aspects of the prior art processes is compromised by the presence of lead minerals or soluble silicates. With some of the prior art processes, the presence of soluble silicates forms a very gelatinous mass of hydrated silica which renders the leach solution unfiltrable. Soluble silicates are more basic than insoluble silicates. For example, the orthosilicates $Zr_2SiO_4$ (the mineral Willsmite) or $2ZnO.SiO_2.H_2O$ (the mineral hemimorphite) are acid soluble, while the metasilicate $ZnSiO_3$ is insoluble. Similarly, there are acid soluble orthosilicates of iron —$Fe_2SiO_4$ (fayalite) and of magnesium ($Mg_2SiO_4$, forsterite) while metasilicates $FeSiO_3$ (gruenerite) and $MgSiO_3$ (dinoenstatite) are insoluble. When soluble silicates dissolve, they form solutions very supersaturated in quartz ($SiO_2$), but the precipitation of stable quartz crystals requires geologic time frames, and so gelatinous silica is formed instead. This gelatinous silica is an impediment to liquid solids separation and a serious impurity in zinc plant electrolytes. Exemplary processes for the recovery of Zn from Zn silicate ores are described in Canadian patent 876,034 and in Kumar et al "Zing Recovery from Zawar Ancient Siliceous Slag" Hydrometallurgy, (1986) 15:267–280.

The process according to this invention overcomes several of the problems associated with the prior art processes in providing a process in which high concentrations of sulfuric acid are used to convert zinc sulfide in zinc sulfide containing ores. The process is operated at temperatures in the range of 90° C. to less than boiling point of the conversion solution to convert the zinc sulfide into zinc sulfate crystal monohydrate which in the conversion solution forms crystals. Hence, the process, in accordance with this invention, provides a novel way to achieve separation of zinc sulfate from a $H_2SO_4$ treatment solution without requiring an electrowinning step.

SUMMARY OF THE INVENTION

In accordance with an aspect of the invention, a hydrometallurgical process is provided for converting zinc sulfide in an ore containing zinc sulfide. The zinc sulfide is chemically converted at elevated temperatures to $ZnSO_4.xH_2O$ which crystallizes substantially in the monohydrate form as $ZnSO_4.H_2O$ in a conversion solution having a high concentration of $H_2SO_4$. The process comprises:

contacting the zinc sulfide of the ore with the conversion solution which comprises a concentration of sulfuric acid selected from the range of about 45% by weight up to about 70% by weight of the conversion solution; and at a temperature in the range of about 90° C. to less than boiling point of the conversion solution for the selected concentration of sulfuric acid;

maintaining the conversion solution at the elevated temperature and at the concentration of the sulfuric acid to ensure continued formation of the crystals of $ZnSO_4 \cdot H_2O$ until substantially all available ZnS is chemically converted; and separating the $ZnSO_4 \cdot H_2O$ crystals and remaining solids of the ore from the conversion solution.

According to another aspect of the invention, the chemical conversion preferentially removes zinc from ores containing other sulfides, such as copper sulfide, the preferential chemical conversion of zinc sulfide produces $H_2S$ in the conversion solution which provides a reducing condition. The reducing condition in the conversion solution essentially precludes chemical conversion of other metal sulfides and in particular copper sulfide; hence separation of zinc sulfate from the zinc containing ores provides a copper sulfide enriched ore material.

In accordance with another aspect of the invention, the recovered crystals of $ZnSO_4 \cdot H_2O$ may be dissolved in a solution having a low concentration of sulfuric acid where the low concentration of sulfuric acid may be derived from a zinc recovery electrolytic cell.

BRIEF DESCRIPTION OF THE DRAWINGS

FIG. 1 is a diagram of experimental test results for temperature versus $H_2SO_4$ concentration wherein the region of successful conversion of zinc sulfide to zinc sulfate monohydrate is identified. The legend for the diagram is the "☐" symbol indicates less than 50% zinc extraction and the "Δ" indicates more than 50% zinc extraction.

DESCRIPTION OF THE PREFERRED EMBODIMENT

The process of this invention is particularly suited in the treatment of zinc sulfide metal ores which contain copper sulfides, lead sulfides, silicates or a mixture of copper sulfides, lead sulfides and/or silicates with zinc sulfides. The process allows for the zinc to be preferentially recovered therefrom without recovery of the copper, lead or interference by silicates in the ore. The ore may be either in a finely divided concentrate form, a finely divided rich ore or a combination of the two and hence the term ore is intended to mean anyone of these alternatives.

Examples of such mineral bearing ores commonly include chalcopyrite, chalcocite, bornite, tetrahedrite, sphalerite, galena, molybdenite, pyrite, pyrrhotite and arsenopyrite. The ore is in particle form and is preferably ground such that 75% of the finest particles pass 275 mesh; i.e., in the range of 50 microns or less. This ensures a finely divided material on which the reagents used in the process of this invention react. Most copper and zinc ore sources normally include chalcopyrite, sphalerite, bornits, pyrite, galena and mixtures thereof. In a preferred aspect of the invention, the objective is to recover zinc in addition to the conversion aspect of the invention, where such recovery is in the form of monohydrate zinc sulfate crystals.

It is also appreciated that such ores may include precious metals such as rhodium, palladium, platinum, silver and gold. Usually such constituents are in trace amounts and may not warrant recovery. It has been found that these precious metals do not present a problem with respect to the processing conversion conditions. Similarly, small amounts of Pb, Cd, As and Sb are commonly found in such ores. It has also been found that the presence of iron in the ore also does not present any processing problems and although most iron sulfide minerals are not reacted, iron in the form of marmalite (Zn,Fe)S or pyrrhotite ($Fe_{1-x}S$) is converted into crystalline ferrous sulphate ($FeSO_4$) and can be separated from zinc sulfate monohydrate in subsequent processing steps familiar to those versed in the art.

The zinc conversion process of the present invention involves the production of monohydrate zinc sulfate crystals from the zinc sulfide fraction in the ore. Sufficiently concentrated sulfuric acid at a sufficiently high temperature is used to yield hydrogen sulfide and to convert all the available zinc sulfide. The preferred application is in the separation of zinc from copper containing ores and in particular ores containing greater than 0.5% by weight and usually greater than 1% by weight of copper. As previously noted, such ores are not commercially treatable by the Sherritt Gordon pressure leach process of U.S. Pat. Nos. 4,071,421 and 4,440,569, while at the same time not decomposing or converting any sulfidic copper minerals. This absence of reaction with the copper sulfides is believed to be due to the presence of the reducing $H_2S$ from the preferential zinc sulfide conversion reaction.

Although the chemistry in the well known prior art leaching process involves the use of sulfuric acid, it is not fully understood. That reaction generally proceeds as follows:

$$ZnS + H_2SO_4(aq) \rightleftharpoons ZnSO_4(aq) + H_2S(g) \quad (1)$$

The reaction proceeds under ordinary conditions, that is at room temperature and at low concentrations of $H_2SO_4$; e.g. 1 molar sulfuric acid (98 grams of $H_2SO_4$ per liter of leach solution).

While it has been known that the reaction equilibrium moves to the right with increasing acid concentration and temperature, that is, increasing zinc sulfate concentration and hydrogen sulfide partial pressure, we have discovered that the reaction will go to completion (and not merely to an equilibrium) when the acid concentration is high enough to salt out (precipitate) a lower hydrate of zinc sulfate and when the temperature is sufficiently high to yield a hydrogen sulfide pressure in excess of the ambient pressure in the reactor. Under these conditions, where the reaction goes to completion (as distinct from reaching an equilibrium) the salt produced from zinc sulfide is $ZnSO_4 \cdot H_2O$ through all the $H_2SO_4$ concentration range of this invention.

The zinc conversion is therefore believed to proceed as follows at high concentrations of $H_2SO_4$ and at high temperatures:

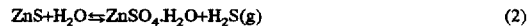

$$ZnS + H_2O \rightleftharpoons ZnSO_4 \cdot H_2O + H_2S(g) \quad (2)$$

It has been found that by increasing the acid concentration and temperature, a point is reached where the produced zinc sulfate in its monohydrate form crystallizes and drops out of solution and surprisingly any copper sulfides are not converted, nor do copper sulfates precipitate out of solution. Therefore, it has been found that there is a minimum sulfuric acid concentration and a minimum temperature at which equilibrium of the above reaction exceeds the point where hydrogen sulfide partial pressure is i atmosphere and the solution is saturated with zinc sulfate. Above these minimum concentration and temperature values, sufficient hydrogen sulfide gas is produced and boils off and monohydrate zinc sulfate crystals form until all substantially available zinc sulfide in the ore is converted to zinc sulfate. By use of the term "substantially", it is intended to mean that all zinc sulfide of the ore that is available for conversion by the $H_2SO_4$ solution is converted on the basis of a commercially viable reactor residence time and commercially viable extent of grinding and crushing to a sufficiently fine ore particle size. We have also determined that operating at extremely high acid concentrations and temperatures, such as with the process of aforementioned Canadian patent 864,455, is not acceptable because both the zinc and copper remain in solution as anhydrous sulfate and unacceptable amounts of plastic sulfur and $SO_2$ are produced.

The theoretical minimum sulfuric acid concentrations and minimum temperature can be calculated empirically using reported data. Theoretical data, as applied to the equilibrium of equation (1) in a commercial recovery environment are not available, but may be extrapolated from measured data reported—L. T. Romankiw and P. L. DeBruyn, "Kinetics of Dissolution of Zinc Sulfide in Sulfuric Acid", in *Unit processes in Hydrometallurgy*, (eds. Wadsworth and Davis), Gordon & Breach Science Publishers, N.Y. (1964), pp 45–65. It is important to understand, however, that these measured data were made on synthetic zinc sulfide precipitates, and that natural zinc sulfides are up to 20 KJ per mole more stable. Data from Bard, Parsons, and Jordan "Standard Potentials in Aqueous solution" published by the International Union of Pure and Applied Chemistry (Marcel Dokker, New York and Basel, 1985), pp. 252–253 give the following thermodynamic values for zinc sulfide phases:

| Phase | $\Delta H°_{298}$ (Kj/Mole) | $\Delta G°_{298}$ (Kj/Mole) |
|---|---|---|
| ZnS, sphalerite | −206.0 | −201.3 |
| ZnS, wurtzite | −192.6 | −185 |
| ZnS, Precipitate | −185 | −181 |

The theoretical calculations on precipitated ZnS would indicate that as little 20% by weight sulfuric acid at 130° C. and a minimum of 35% by weight sulfuric acid at 70° C. would effect such conversion. These theoretical calculations are based on solubility data of zinc sulfate in sulfuric acid. Based on analysis of this data, it would appear that at sulfuric concentrations of approximately 20% by weight and a temperature of about 130° C., or approximately 35% by weight sulfuric acid at a temperature of 70° C., would convert zinc sulfide into zinc sulfate monohydrate which should have presumably crystallized and dropped out of the conversion solution. Quite surprisingly however, at these lower concentrations of $H_2SO_4$, no zinc sulfate monohydrate was formed. Any zinc sulfate formed in the solution was not enough to saturate the acid conversion solution, so that no crystals of zinc sulfate monohydrate appeared in conversion solutions of that lower concentration. It would appear that these theoretical calculations were not accurate in respect of what we have found is required in terms of the minimum concentration of sulfuric acid and minimum temperatures to achieve production of the zinc sulfate monohydrate which would crystallize in the conversion solution. These differences appear to be due to the thermodynamic calculations being somewhat askew because the reaction was not as favourable as the theoretical data would indicate. The natural ore is far more stable and hence less apt to be converted compared to the materials reacted with sulfuric acid on which the theoretical calculations were based. The zinc sulfide was made synthetically, where the material contained less than 0.006% iron and was of size in the range of 0.1 to 0.3 microns. On the other hand, actual ores to be treated, in accordance with this process, may be of the above noted types and in particular marmatite containing approximately 5% to 10% iron and having a particle size of 50 microns or greater.

Higher concentrations of sulfuric acid and higher temperatures for the conversion solution were investigated in order to achieve the process conditions of equation (2). By various tests carried out in accordance with this invention and as described in the accompanying examples, it has been determined that at a temperature as low as about 90° C. and at approximately 70% by weight of sulfuric acid in the conversion solution, sufficient zinc sulfate is formed which drops out of the conversion solution in crystalline form as zinc sulfate monohydrate. At a concentration of sulfuric acid of approximately 45% by weight in the conversion solution, a temperature of about 130° C. provides sufficient zinc sulfate monohydrate which crystallizes and drops out of the conversion solution. Hence the process of this invention has an operable concentration of sulfuric acid and temperature well above that predicted by the theoretical values. Furthermore, it has been found that increasing beyond approximately 75% by weight of sulfuric acid also results in a commercially inoperable processes, because of the formation of plastic sulfur and $SO_2$ and the conversion of copper into solution. Hence the extremely high concentrations and temperatures employed, in accordance with the aforementioned prior art, such as in Canadian patent 864,455, are not applicable in respect of this invention.

FIG. 1 is a plot of the experimental test results which clearly indicate the region in terms of temperature versus concentration of sulfuric acid in which zinc extractions greater than 50% can be achieved in approximately one to three hours with minimal, if any, generation of sulfur. The experimental test results are based on the conversion of ores and ore concentrates so that it is believed that the parameters in respect of temperature and sulfuric acid concentration can be extrapolated to a commercial process to achieve the preferential removal of zinc from zinc sulfide containing ores, where other sulfides may be present including copper sulfide which is not affected by the conversion process and is not crystallized out with the zinc. This processing condition, in accordance with this invention, provides a significant advance in the hydrometallurgical treatment of ores to remove zinc sulfides for recovery and hence provide a treated ore which is now enriched in copper sulfide for treatment by other processes, such as that described in applicant's copending U.S. patent application Ser. No. 009, 844 filed Jan. 27, 1993.

Based on the region identified in FIG. 1, it is apparent that, at any temperature above approximately 90° C. and for a selected sulfuric acid concentration in excess of about 60% by weight, conversion of zinc can be achieved and for temperatures up to approximately the boiling point of the conversion solution for weaker Sulfuric acid concentrations, such as in the range of 45% to 55%, conversion can also be achieved. It is also understood that the rate of reaction increases measurably if at the higher concentrations of sulfuric acid, either approaching the boiling point of the conversion solution or in the range of about 130° C. to 140° C., excellent preferential conversion of the zinc sulfide is achieved without impacting on the copper sulfides remaining in the ore.

It is also apparent that concentrations of sulfuric acid above 80% by weight or less than 40% by weight do not produce any commercially significant result, either by virtue of poor zinc extractions at less than 40% $H_2SO_4$ or by virtue of generating $SO_2$ and plastic sulfur at greater than 80% $H_2SO_4$. Region B is indicated on FIG. 1 to identify the predominate production of $SO_2$ which is undesirable. Region A indicates the process parameters of the aforementioned Canadian Patent 864,455 to Treadwell Corporation which results in the unacceptable production of $SO_2$ and the gummy deposit of sulphur.

Therefore in accordance with the preferred aspect of the invention, practising any of the conditions as set out in FIG. 1, which are within the region identified as the zinc extraction region, generates a sufficiently high yield of the zinc sulfate monohydrate at equilibrium such that the conversion solution becomes saturated with the monohydrate form, whereby the zinc sulfate monohydrate commences to crystallize and fall out of solution. Providing fresh ore is continuously introduced to the conversion solution and the concentrations of sulfuric acid and temperature for the conversion solutions are maintained, the conversion of zinc sulfide to zinc sulfate monohydrate will continue and provide on a continuous basis salt containing the zinc sulfate monohydrate which can be later processed for recovery of the zinc.

It is believed that, due to the presence of hydrogen sulfide gas which boils off the conversion solution during the conversion process, the conversion of copper minerals and, in particular, copper sulfide is prevented by a far poorer equilibrium between copper ions in solution, hydrogen sulfide gas, and sulfuric acid. Indeed, any copper ions initially present in the solution would be precipitated as copper sulfides. Hence the process provides an excellent commercial zinc-copper separation, particularly with ores or concentrates containing more than 0.5% by weight copper and usually in excess of 1% by weight copper in the form of copper sulfides. It is expected that some of the iron, particularly in the form of $(Zn, Fe)S$ and $Fe_{0.88}S$ might react with the conversion solution. It is very doubtful, however, that other types of iron, such as $FeS_2$ (pyrite) and $FeAsS$ (arsenopyrite) would be attacked by the conversion solution. It is also doubtful that arsenic or antimony would enter the conversion solution. Certainly mercury, silver and gold would not enter the conversion solution. However, magnesium and calcium minerals would be converted and enter the conversion solution, but unlikely any highly silicious minerals or quartz. Silicious zinc sulfide ores presented a significant prior art processing problem, because of the conversion of soluble silicates into gelatinous hydrated silicate substituents which interferes or prevents filtration to separate leached zinc from the treated ore or concentrate. The process, in accordance with this invention, overcomes this problem because in treating silicate/zinc ores at the elevated temperature and prescribed range of sulfuric acid concentrations, the silicates are marginally hydrated so that the silicates remain solid rather than forming a gelatinous mass. Such solid form of silicates does not, then, appreciably interfere with the process of the zinc sulfide conversion and the falling out of the zinc sulfate monohydrate crystals.

Hence in removal of the crystalline zinc sulfate monohydrate from the conversion solution, there may be trace amounts of iron, magnesium and calcium, but these minerals can be readily separated from the zinc sulfate monohydrate material during the recovery of the zinc from the crystalline material. Ideally, the recovered crystalline material, once separated from the conversion solution, can be treated with either water or dilute acid solution to dissolve the zinc sulfate monohydrate in the form of $ZnS_4.xH_2O$. The remaining constituents in the crystalline material may be insoluble in the dilute acid mixture or water; hence providing a further purification of the zinc sulfate before carrying out electrowinning or the like to remove or recover zinc from the composition.

The reaction of equation (2) is endothermic and hence requires the input of heat during the conversion which may either be carried out on a batch or continuous basis. On a continuous basis or batch basis, heat may be introduced to the reactor by various types of heat exchange devices, although in view of the very high concentration of sulfuric acid, the preferred way of heating the reaction is by submerged combustion.

The amount of heat needed for this endothermic reaction is far smaller than that necessary for boiling down a 15% sulfuric acid solution to 60 to 80% sulfuric acid, as previously described with respect to U.S. Pat. No. 4,710,277.

The zinc sulfide containing ore may be in the form of a concentrate, a finely divided ore or the like. The particle size of the finely divided ore is normally in the range of 50 microns to 100 microns. It is appreciated that the process will work equally well on various particle sizes for the ore and ore concentrate. However as is understood, the finer the division in the ore, the faster the rate of reaction in converting the available zinc sulfide and as well, the less residence time to achieve greater than 50% conversion of the zinc sulfide. Under optimum conditions, it is expected that conversions in the range of 80% to 90% can be achieved with sufficiently fine ore, temperature and sulfuric acid concentration selection. The selection of the upper range of temperature is, of course, determined by the boiling point of the conversion solution for a selected concentration of sulfuric acid. It is appreciated that, as the sulfuric acid concentration increases, so does the boiling point of the conversion solution. Conversion solutions having a concentration of sulfuric acid in the range of 40% to 50% by weight boil at approximately 120° C. to 140° C., whereas at sulfuric acid concentrations of 70% to 80% by weight, the conversion solution boils in the range of 165° C. to about 195° C. It is appreciated, however, that, in achieving equilibrium for the reaction of equation (2), sufficient hydrogen sulfide is produced that it will tend to bubble off at temperatures below the boiling point of the conversion solution. Preferably the hydrogen sulfide is removed from the reactor so that the reaction is carried out at approximately atmospheric pressure. The reaction could be expedited by enhancing the removal of $H_2S$ from the reaction solution by applying a vacuum or using a flushing gas. Lower concentrations of sulfuric acid and/or temperature might then be possible. However, the application of a vacuum or the addition of a flushing gas to the reactor, which has such a high concentration of sulfuric acid, would dramatically increase the overall costs in the process and are believed to render it economically unviable.

The hydrogen sulfide gas removed from the reactor may be treated by various techniques to either convert the hydrogen sulfide into sulfur or sulfuric acid. If converted into sulfuric acid, it can be used to replenish the conversion solution.

The various tests, as carried out in establishing the operable region of this process, establish several factors which include laboratory tests and indicate that for an economical zinc extraction the zinc should be converted by at least 50% within one hour of being subjected to the conversion solution. Amounts of sulfur generated, normally in excess of 0.5 to 1 gram based on the quantities used in the laboratory tests, would predict an uneconomic process because of excessive generation of sulfur.

Experimental Tests

The following laboratory scale experiments demonstrate the useful region of the process parameters involving sulfuric acid concentration and temperature. The experimental tests were carried out principally as follows. A suitable zinc sulfide ore or concentrate was selected and finely divided to approximately 50 microns size. The suitable zinc sulfide ore may be sphalerite or bulk concentrates made from zinc copper sulfide ores. Copper in the ore may be in equal amounts compared to the weight of zinc in the ore and may be less than weights of iron in the ore. For example, the ratios of zinc, copper to iron may be 2:2:3.

Approximately 100 grams of the mineral in 150 mls of Water is placed in the reaction flask. Approximately 100 mls of the acid solution of the selected sulfuric acid concentration is slowly added to the mixture while mixing. The conversion solution was allowed to react with the ore from 1 to 3 hours, where the temperature of the reaction was maintained at the selected temperature. At the end of the selected period of reaction, any crystalline material was filtered from the conversion solution and an analysis carried out with respect to amount of zinc and other components in the conversion solution in the crystalline material and in any other solids. The results, in terms of temperature, concentration of sulfuric acid and percent conversion is set out in Table 1. From these results, it is apparent that acceptable conversions in excess of 50% and minimal production of sulfur are identified.

TABLE 1

| ZnS Conversion - Acid Concentration Effect | | | |
|---|---|---|---|
| Exp. # | Temperature °C. | % Zn converted from Ore | Reaction Time/Hours |
| 20% Sulfuric Acid | | | |
| 1 | 70 | 5.0 | 1 |
| 2 | 100 | 22.5 | 3 |
| 30% Sulfuric Acid | | | |
| 3 | 70 | 12.4 | 2 |
| 4 | 100 | 8.0 | 2 |
| 5 | 114 | 19.8 | 1 |
| 40% Sulfuric Acid | | | |
| 6 | 70 | 7.9 | 1 |
| 7 | 100 | 18.0 | 1 |
| 8 | 114 | 22.5 | 1 |
| 9 | 120 | 23.7 | 1 |
| 10 | 120 | 24.2 | 1 |
| 45% Sulfuric Acid | | | |
| 11 | 70 | 2.0 | 3 |
| 12 | 100 | 23.5 | 1 |
| 13 | 127 | 51.2 | 3 |
| 14 | 124 | 76.0 | 1 |
| 55% Sulfuric Acid | | | |
| 15 | 70 | 13.8 | 1 |
| 16 | 100 | 47.7 | 1 |
| 17 | 132 | 89.0 | 1 |
| 60% Sulfuric Acid | | | |
| 18 | 138 | 97.4 | 1 |
| 65% Sulfuric Acid | | | |
| 19 | 70 | 35.6 | 1 |
| 20 | 100 | 76.9 | 1 |
| 70% Sulfuric Acid | | | |
| 21* | 136 | 91.5 | 1 |
| 75% Sulfuric Acid | | | |
| 22* | 70 | 20.6 | |
| 23* | 100 | 77.7 | 1 |
| 24* | 134 | 91.8 | 1 |

*Excessive amount of sulfur produced in excess of 0.5 to 1 gram.

In accordance with these experimental results, the process parameters for an economically viable process have been defined which surprisingly and with repeatable success provide a system for recovering zinc from zinc sulfide ores, which may include copper sulfide, where the resultant material can be solubilized to provide a solution from which zinc may be electrowon. When the ore includes copper sulfides, the process provides ore now enriched in copper sulfide which may be processed to recover copper therefrom.

Although preferred embodiments of the invention are described herein in detail, it will be understood by those skilled in the art that variations may be made thereto without departing from the spirit of the invention or the scope of the appended claims.

We claim:

1. In a hydrometallurgical process for converting zinc sulfide in an ore containing zinc sulfide, said zinc sulfide being chemically converted at elevated temperatures to form $ZnSO_4.xH_2O$ which crystallizes substantially in the monohydrate for as $ZnSO_4.H_2O$ in a conversion solution having a high concentration of $H_2SO_4$, the improvement comprising:

i) selecting an ore which contains both zinc sulfide and copper sulfide, said ore containing greater than 1% by weight of copper.

ii) contacting said zinc sulfide/copper sulfide ore with a conversion solution comprising a concentration of sulfuric acid selected from the range of about 45% by weight up to about 70% by weight of said conversion solution and at said elevated temperature in the range of 90° C. to less than boiling point of said conversion solution for said selected concentration of sulfuric acid with the proviso that said less than boiling temperature is less than 130° C. for an acid concentration of 45% and less than 140° C. for an acid concentration of 70%;

iii) ensuring a reducing condition in the conversion solution, by virtue of the concentration of $H_2SO_4$, temperature, and maintenance of atmospheric pressure, to produce continuously sufficient $H_2S$ to preclude oxidation of the copper sulfide, iv) maintaining said conversion solution at said elevated temperature and at said range of concentration of said sulfuric acid to ensure continued formation of said crystals of $ZnSO_4.H_2O$ until substantially all available ZnS is chemically converted where by virtue of temperature selection and ensuring a reducing condition, said chemical conversions avoids chemical conversion of copper sulfide; and v) separating said $ZnSO_4.H_2O$ crystals and remaining solids of said ore from said conversion solution at said elevated temperature.

2. A process of claim 1 wherein said concentration of sulfuric acid is in the range of 50% by weight to 65% by weight of said conversion solution.

3. A process of claim 1 wherein sulfuric acid and heat are added as needed to said mixture during said chemical conversion of said zinc sulfide to ensure said continued formation of said crystals.

4. A process of claim 1 further comprising dissolving said crystals to separate in the hydrated form $ZnSO_4 \cdot xH_2O$ from said remaining solids of said ore.

5. A process of claim 4, wherein said crystals are dissolved in a solution having a low concentration of sulfuric acid.

6. A process of claim 5, wherein said solution of low concentration of sulfuric acid is electrolyte removed from zinc recovery electrolytic cell.

7. A process of claim 1, wherein said ore is finely divided.

8. A process of claim 1, wherein said ore is a concentrate.

* * * * *

UNITED STATES PATENT AND TRADEMARK OFFICE
CERTIFICATE OF CORRECTION

PATENT NO. : 5,711,922
DATED : January 27, 1998
INVENTOR(S) : Robert N. O'Brien, Ernest Peters It is certified that error appears in the above-identified patent and that said Letters Patent is hereby corrected as shown below:

Column 2, line 13, "Commercial" should be -- commercial --.

Column 2, line 28, "Willsmite" should be -- Willemite --.

Column 4, line 32, "$ZnS+H_2SO_4(aq) \leftrightarrows ZnSO_4(aq)+H_2S(g)$" should be -- $ZnS+H_2SO_4(aq) \leftrightarrow ZnSO_4(aq)+H_2S(g)$ --.

Column 4, line 65, "i" should be -- 1 --.

Column 5, line 22, "processes" should be -- Processes --.

Column 6, line 56, "Sulfuric" should be -- sulfuric --.

Column 9, line 15, "Water" should be -- water --.

Signed and Sealed this

Seventh Day of July, 1998

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,711,922
DATED : January 27, 1998
INVENTOR(S) : O'Brien et al.

It is certified that error appears in the above-identified patent and that said Letters Patent is hereby corrected as shown below:

ON THE COVER PAGE:

Please add -- Assignee: R & O Mining Processing Ltd. --.

Signed and Sealed this

Thirteenth Day of April, 1999

*Attest:*

Q. TODD DICKINSON

*Attesting Officer*  *Acting Commissioner of Patents and Trademarks*